United States Patent [19]

Yata et al.

[11] Patent Number: 4,641,277
[45] Date of Patent: Feb. 3, 1987

[54] SYSTEM FOR DETECTING ACCESS TO STORAGE

[75] Inventors: Kiyoshi Yata; Hideo Sawada, both of Hadano, Japan

[73] Assignee: Hitachi, Ltd., Tokyo, Japan

[21] Appl. No.: 550,199

[22] Filed: Nov. 9, 1983

[30] Foreign Application Priority Data

Nov. 12, 1982 [JP] Japan .................................. 57-197495

[51] Int. Cl.⁴ .............................................. G06F 9/00
[52] U.S. Cl. .................................................. 364/900
[58] Field of Search ... 364/200 MS File, 900 MS File

[56] References Cited

U.S. PATENT DOCUMENTS 3,771,146  11/1973  Cotton et al. ........................ 364/200
3,815,101  6/1974   Boss et al. .......................... 364/200
4,430,705  2/1984   Cannavino et al. .................. 364/200

Primary Examiner—Thomas M. Heckler
Assistant Examiner—John G. Mills
Attorney, Agent, or Firm—Antonelli, Terry & Wands

[57] ABSTRACT

A system for detecting access to a storage in a data processing apparatus which includes an address translation look-aside buffer which holds a part of an address translation table listing correspondences between logical addresses and real addresses, entry of the translation look-aside buffer being referred to upon every access to the storage. Each of the entries is added with information bit indicating whether a storage region corresponding to a given entry includes an area which is allocated for the detection of the access to the storage. Detection as to whether an address for accessing the storage is located within the area allocated for the access detection is not carried out when the identification information indicates that the storage region to be accessed does not include the area allocated for the access detection.

3 Claims, 4 Drawing Figures

SYSTEM FOR DETECTING ACCESS TO STORAGE

The present invention relates to a system for detecting when access is made to a certain memory or storage region of a storage device which is designated when a program event recording is performed, by way of example.

As is known, program event recording (hereinafter also referred to as PER) is adopted as one form of program debugging. As a typical example of such PERs, there may be mentioned the program event recording which is performed in conjunction with the memory region of a storage device by comparing the address (hereinafter generally referred to as the PER address) of a memory or storage region which is allocated for the PER with the address for accessing the storage, as is illustrated in FIG. 1, in which PERS denotes a start address of the storage region allocated for the PER and PERE denotes an end address of the storage region. Whenever access is made to the storage for reading out an instruction therefrom or writing data therein, comparison means 3 checks to see whether the address SA for accessing the storage is located within the memory or storage region designated by the addresses PERS and PERE. When the address for accessing the storage is located within the designated storage region, an interrupt to execution of the program is issued, whereby the relevant information, such as the address of the instruction and the types of the interrupt may be recorded.

Heretofore, the comparison of the PER address with the address for accessing the storage has been performed every time an instruction is to be read out or data is to be written in the storage, when a program commands the PER for the storage region in concern. Accordingly, a lot of time is required for each access made to the storage because of the comparing operation which must be performed for every instruction read out or data written in, involving a significant delay in the processing operation. In this regard, since the comparison of the address for accessing the storage with the PER address is made for checking whether the address for access (SA) falls within the storage region or area defined by the addresses PERS and PERE, the comparison should be made for each of the addresses PERS and PERE. In general, such a comparison involves a subtraction between the SA and PERS (and also between the SA and PERE) to determine whether the result becomes positive or negative, and thus requires a considerable time. As a consequence, the time taken for the debug operations realized by resorting to the PER for the storage region is considerably increased, which is a serious drawback.

An object of the present invention is to realize the detection of access to a designated storage region without incurring degradation in performance.

Another object of the present invention is to provide a data processing apparatus wherein debugging time using the PER address can be reduced by carrying out the comparison between the PER address and the SA only in the case where the SA is very likely located within the PER address region.

In the present-day data processing apparatus, an address translation capability is indispensably required to effect translation between the logical address space and the real address space. For this reason, an address translation buffer or an address translation look-aside buffer (hereinafter also referred to as TLB) is necessarily provided for holding a part of the contents of an address translation table. In view of the fact that the TLB is referred to whenever access is made to the storage, the present invention teaches that each entry of the TLB includes identification information indicating whether a storage region corresponding to a given entry includes an area allocated for access detection, and that detection is performed to determine whether the address for accessing the storage is located within the area allocated for the access detection, only when it is determined from the identification information that the storage region corresponding to the entry referred to includes the area allocated for the access detection. The detection of the identification information can be carried out with ease in a very short time, since it merely checked whether the identification information is present or not. Accordingly, most of the conventional comparison processing can be replaced with the detection of the identification information which involves a simple processing, whereby the debugging time using the PER address can be reduced.

The invention will be more apparent from the following description taken in conjunction with the accompanying drawings in which.

Figure 1:
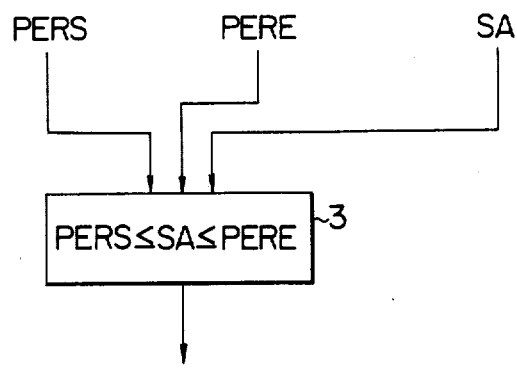
FIG. 1 is a schematic block diagram showing a known logic circuit for detecting the access to a storage region for the program event recording or PER.
Figure 2:
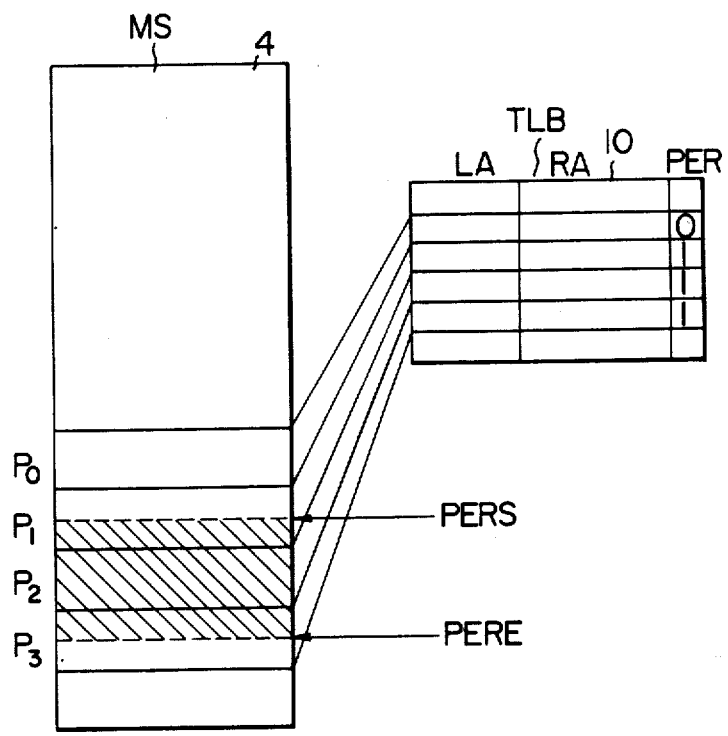
FIG. 2 is a view for illustrating the relationship between a main storage and an address translation look-aside buffer or TLB.

In the following, the present invention will be described in detail in conjunction with an exemplary embodiment thereof by referring to FIGS. 2, 3 and 4. In FIG. 2, there is illustrated the relationship between a main storage (hereinafter also referred to as MS) 4 and a translation look-aside buffer or TLB 10, wherein a storage region of the MS 4 which is allocated for the program event recording or PER is indicated by a hatched region whose start address is denoted by PERS and whose end address is denoted by PERE. Both of these addresses PERS and PERE are given in terms of the logical address. On the other hand, the translation unit for the address translation (hereinafter referred to as a page) is on the order of 2K bytes or 4K bytes. The TLB 10 has entries corresponding to the pages of the MS 4, respectively. Each of the entries is composed of a real address section (hereinafter also referred to as RA), a corresponding logical address section (hereinafter also referred to as LA) and a PER bit. Assuming now that the storage region allocated for the PER extends over the pages $P_1$, $P_2$ and $P_3$ in such a manner as illustrated in FIG. 2, the PER bit of the entry of the TLB 10 which corresponds to the page $P_0$ is set to "0", while the PER bits corresponding to the pages $P_1$, $P_2$ and $P_3$ are set to "1", respectively. When the PER bit outputted from the TLB 10 upon accessing of the MS 4 is "1", the microprogram being executed at that time is branched to a PER address comparison routine for determining whether the address for accessing the MS 4 is located between the start address PERS and the end address PERE of the storage region allocated for the program event recording or PER. If the above comparison results are negative, this means that the address for accessing the MS is outside the storage region allocated for the PER, whereby the fetching or storage operation to the MS 4 is allowed to be continued. On the other hand, when the comparison routine results are affirmative, this means that the address for accessing the MS is located within the storage or memory region allocated for the PER. In this case, a PER interrupt flag is set and the corresponding program event is recorded through the interrupt processing following the fetch or store operation to the MS 4.

Figure 3:
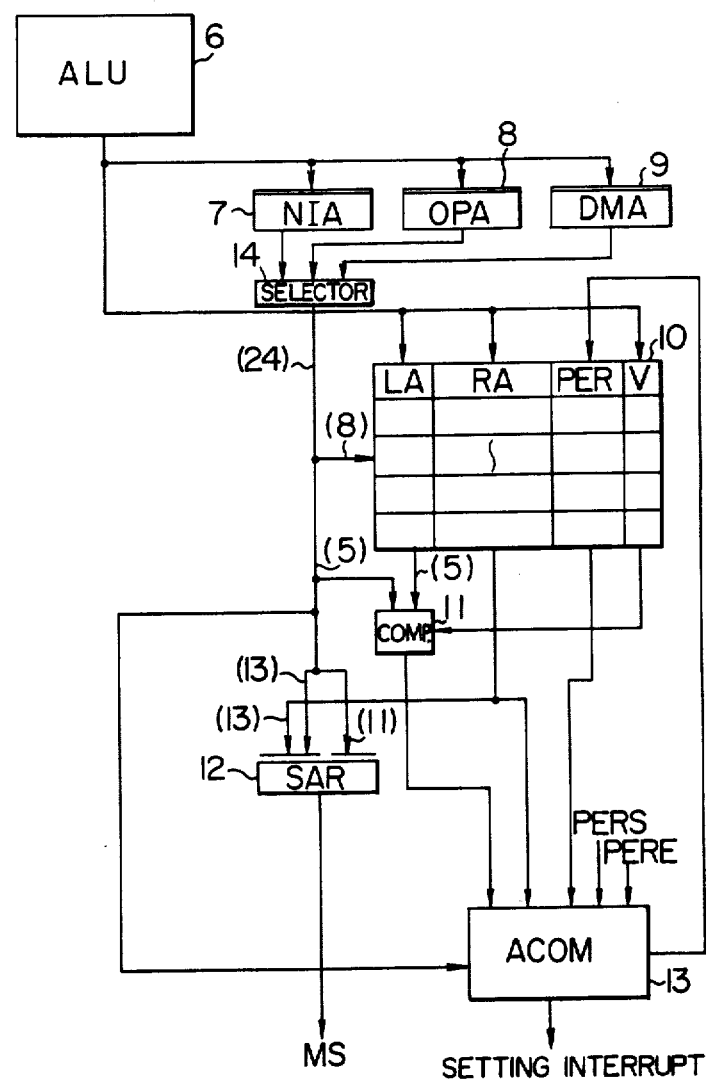
FIG. 3 is a block diagram showing a logic circuit for an access detecting system according to an embodiment of the invention.
Figure 4:
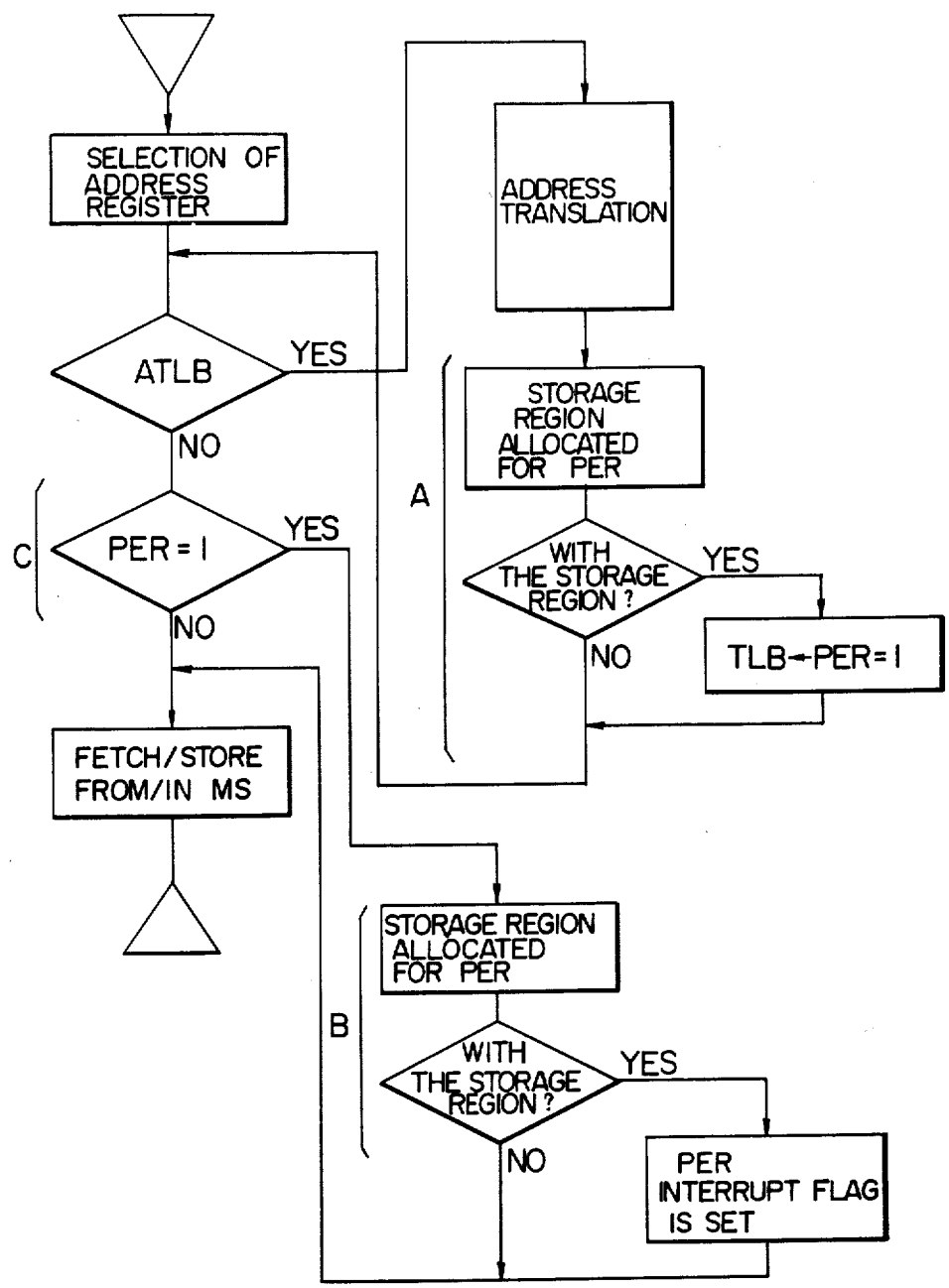
FIG. 4 is a flow chart for illustrating a microprogram for performing access to a main storage.

FIG. 3 shows a logical block diagram of a control circuit including the translation look-aside table or TLB 10, while FIG. 4 shows in a flow chart a microprogram for effecting the accessing to the main storage or MS. In FIG. 3, reference numerals 7, 8 and 9 denote address registers for accessing the MS, these registers being located with logical addresses from an arithmetic and logical unit or ALU 6 in precedence to the access to the MS. More particularly, the address registers 7, 8 and 9 are loaded with an instruction address NIA, an operand address OPA and other address DMA, respectively, wherein the bit length of each address is 24 bits among which the most significant 13 bits are made use of for the address translation. In FIG. 3, numerals inserted within brackets represent the bit numbers. Upon accessing the MS 4, one of the address registers 7, 8 and 9 is first selected by a selector 14, whereby the translation look-aside buffer or TLB 10 is accessed by using a part of the address outputted from the selector 14. When the TLB 10 has 256 columns, the address used for accessing the TLB 10 consists of 8 bits, while the remaining five bits are compared with the real address or LA portion read out from the TLB 10 through a comparison circuit 11. When coincidence is found in this comparison and a V-bit representative of the validity of the column read out simultaneously from the TLB 10 is "1", the result of the test labelled ATLB (Absence in TLB) in FIG. 4 is then negative (i.e. NO). ATLB means that a logical address to be translated does not exist in the current TLB. In the case of the result being negative, thirteen bits constituting the RA portion of the address outputted from the TLB 10 are placed in the real address register 12 at the more significant 13 bit positions thereof while the less significant 11 bit positions of the register 12 are loaded with the less significant 11 bits of the 24-bit-address supplied from the selector 14, whereby the address for accessing the MS 4 is formed in this real address register 12. In this conjunction, when the test of the PER bit read out from the TLB 10 has proven to be "0", this means that the address for accessing the MS supplied from the address register 7, 8 or 9 is not located in the storage region allocated for the PER. Consequently, the access is made to the MS on the basis of the content of the real address register 12. On the other hand, when the PER bit is "1", there exists the possibility that the supplied address for accessing the MS 4 may be located within the storage region allocated for the PER operation, the PER address comparison routine (designated by B in FIG. 4) is branched from the microprogram to check whether the address in concern is located within the storage region allocated for the PER operation. In this routine, an address comparison circuit (hereinafter abbreviated to ACOM) 13 is so controlled as to compare the address output from the selector 14 with the PER address. When it is detected through this comparison that the address supplied through the selector 14 is located within the storage region allocated for the PER operation, the PER interrupt flag (not shown) is set. Upon completion of the PER address comparison routine, the MS 4 is accessed with the address placed in the real address register 12 under control of the microprogram.

In case the comparison effected by the comparator circuit 11 results in a discrepancy or the V-bit is "0", the test ATLB shown in FIG. 4 results in an affirmative result (i.e. YES), whereupon an address translation routine is branched from the microprogram. Through this routine, a new entry corresponding to the not-translated page is read out from an address translation table contained in the MS 4 to be registered in the TLB 10. Additionally, the PER address comparison routine (designated by A in FIG. 4) is executed for determining whether the new page contains a storage region allocated for the PER operation. At this time, the ACOM 13 is so controlled as to compare the logical address of a new page and PER addresses of newly registered entry. When it is found through this comparison that the new page contains the storage region allocated for the PER operation, the PER bit of the entry in concern is set to "1". Upon completion of the PER address comparison routine, the microprogram is resumed to the state immediately preceeding the look-up operation of the TLB 10.

In conjunction with the embodiment described above, consideration is given to the probability a of the PER address comparison routine designated by A in FIG. 4 being executed. This probability a is equal to the probability of the test ATLB being affirmative (i.e. YES). The latter is usually as low as several percentages although it depends on the capacity of the TLB. Accordingly, the probability a is equally low. Next, let's consider the probability b of the PER address comparison routine designated by B in FIG. 4 being executed. This probability b is equal to the probability of the PER bit being "1" at the step C shown in FIG. 4. Inherently, the purpose of the PER operation is to effect the debugging the program by recording individually the jump of the program to a specific region (e.g. reading of instruction) or modification of a particular region (e.g. writing of data). In this conjunction, it should be noted that the region which can be designated by the PER address is of the order of several K (K=1,024) bytes, which is very small when compared with the whole MS space. Thus, it is safe to say that the probability of the PER bit being "1" is low, which in turn means that the probability b is equally low.

It will now be appreciated from the foregoing description that in the case of the illustrated embodiment of the invention, the address comparison operation is performed at a very low frequency or probability when compared with the prior art system in which the address comparison operation is carried out every time an instruction is read out or data is written in so far as the PER concerning the storage region is commanded. In other words, the address comparison operation can be rendered unnecessary for most of the storage accessing operations according to the invention while the PER operation concerning the storage region can be realized without degradation in performance.

In the case of the illustrated embodiment, it is assumed that the PER address is given in terms of the logical address. It will however be understood that it may be the real address. In that case, the ACOM 13 is so controlled as to compare the PER address with the real address RA upon creation of the entry while comparing the PER address with the content of the address register 12 upon accessing the storage MS 4. Further, an address switch may be provided at the input side of the ACOM 13 to thereby select the logical address or the real address in a convenient manner.

In the foregoing description, it has also been assumed that the address comparison operation is performed upon registration of a new entry in the TLB to obtain the PER bit. However, the invention is not necessarily restricted to such arrangement. The address comparison operation may be executed upon creation or updating of the address translation table contained in the MS or when the PER address is given, to thereby store previously the result of the comparison in the table. In this case, the address comparison operation is not required when a new entry is registered in the TLB, since the PER bit is available from the address translation table contained in the MS 4. More specifically, the address comparison operation is required only when the test ATLB is negative (i.e. NO) and when the PER is "1". Thus, the probability of accessing the storage or MS at a higher speed can be increased.

As will be appreciated from the foregoing, the detecting operation is performed to determine whether the address to be accessed is located within the region allocated for the access detection only when the storage region corresponding to the entry of the TLB referred to contains the region allocated for the access detection. Consequently, the frequency at which the detecting operation takes place is greatly decreased without involving degradation in performance, to assure the detection of the access of the designated storage region with reliability.

What is claimed is:

1. A data processing apparatus comprising:
   storage means having a plurality of storage locations divided into a plurality of pages for storing information;
   address generating means for generating a logical address having a first address portion representing a logical page and a second address portion representing an internal address of a storage location on the page;
   an address translation lookaside buffer coupled to said address generating means for translating said logical address into a real address which represents a storage location of said storage means, said address translation lookaside buffer having a plurality of entries each of which stores a logical page address and real page address corresponding to the first address portion of the logical address;
   means connected to said address translation lookaside buffer for obtaining said real page address from an entry of said address translation lookaside buffer which stores said logical page address coinciding with said logical page address provided by said address generating means and for outputting the real page address obtained from said entry and the second address portion of said logical address as said real address; and
   address comparison means for detecting whether said address outputted by said translation lookaside buffer or said logical address identifies a storage location within a predetermined storage area of said storage means;
   wherein each entry of said address translation lookaside buffer further stores identification information indicating whether said real page address or said logical page address stored in said entry includes said predetermined storage area in said storage means, and further including means for activating said address comparison means only when the identification information read out from an entry of said address translation lookaside buffer as a result of the translation of a logical address thereby indicates that said real address corresponding to the entry includes said predetermined storage area.

2. A data processing apparatus according to claim 1, further comprising means for obtaining a real page address corresponding to the logical page address and storing the logical page address and the real page address when the logical page address generated by said address generating means is not stored in said translation lookaside buffer, said address comparison means further comprising means for detecting whether said real or logical page address newly stored in said translation lookaside buffer contains said predetermined storage area and for storing the result of the detection as identification information in said entry which stores said newly stored real or logical address.

3. A data processing apparatus comprising:
   storage means having a plurality of storage locations divided into a plurality of pages for storing information;
   address generating means for generating a logical address having a first address portion representing a logical page and a second address portion representing an internal address of a storage location on the page;
   an address translation means for translating said logical address into a real address which represents a storage location of said storage means, said address translation means having a plurality of entries each of which corresponds to a logical page address and stores a real page address;
   control means for reading out the content from an entry which is designated by said logical page address provided by said address generating means and for outputting the read out real page address and said second portion provided by said address generating means as said real address; and
   address comparison means for detecting whether said address outputted by said translation lookaside buffer or said logical address identifies a storage location within a predetermined storage area of said storage means;
   wherein each entry of said address translation lookaside buffer further stores identification information indicating whether said real page address or said logical page address stored in said entry includes said predetermined storage area in said storage means, and further including means for activating said address comparison means only when the identification information read out from an entry of said address translation lookaside buffer as a result of the translation of a logical address thereby indicates that said real address corresponding to the entry includes said predetermined storage area.

* * * * *